United States Patent
Kwak

(10) Patent No.: US 8,325,300 B2
(45) Date of Patent: Dec. 4, 2012

(54) DISPLAY PANEL

(75) Inventor: Chang-Hun Kwak, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 341 days.

(21) Appl. No.: 12/828,896

(22) Filed: Jul. 1, 2010

(65) Prior Publication Data

US 2011/0090435 A1     Apr. 21, 2011

(30) Foreign Application Priority Data

Oct. 20, 2009   (KR) .................. 10-2009-0099912

(51) Int. Cl.
  *G02F 1/1335* (2006.01)

(52) U.S. Cl. .................. 349/106; 349/138; 349/110

(58) Field of Classification Search .................. 349/106, 349/138, 110, 43
See application file for complete search history.

(56) References Cited

U.S. PATENT DOCUMENTS

| | | | |
|---|---|---|---|
| 7,738,059 B2 * | 6/2010 | Kim | 349/110 |
| 2007/0184363 A1 | 8/2007 | Kim et al. | |
| 2010/0033658 A1 * | 2/2010 | Tsao et al. | 349/106 |

FOREIGN PATENT DOCUMENTS

| | | |
|---|---|---|
| JP | 2005-173218 | 6/2005 |
| JP | 2006-072176 | 3/2006 |
| JP | 2006-078860 | 3/2006 |
| JP | 2006-184535 | 7/2006 |
| JP | 2006-251783 | 9/2006 |
| JP | 2008-165092 | 7/2008 |
| JP | 2008-299323 | 12/2008 |
| KR | 10-0790866 | 12/2007 |
| KR | 1020080001028 | 1/2008 |
| KR | 1020080001029 | 1/2008 |
| KR | 1020090012725 | 2/2009 |

* cited by examiner

*Primary Examiner* — Thoi Duong
(74) *Attorney, Agent, or Firm* — H.C. Park & Associates, PLC

(57) ABSTRACT

The present invention relates to a display panel that includes a substrate; a first partition arranged on the substrate, defining a first region, and having an undercut; a second partition arranged outside the first partition; a color filter arranged on the substrate and positioned in the first region; and a common electrode arranged on the color filter.

18 Claims, 11 Drawing Sheets

DISPLAY PANEL

CROSS REFERENCE TO RELATED APPLICATION

This application claims priority from and the benefit of Korean Patent Application No. 10-2009-0099912, filed on Oct. 20, 2009, which is hereby incorporated by reference for all purposes as if fully set forth herein.

BACKGROUND OF THE INVENTION

1. Field of the Invention

Exemplary embodiments of the present invention relate to a display panel.

2. Discussion of the Background

Liquid crystal displays are now widely used as a type of flat panel display. A liquid crystal display has two display panels on which electrodes are arranged, and a liquid crystal layer is interposed between the panels. In the liquid crystal display, voltages are applied to the electrodes to align liquid crystal molecules of the liquid crystal layer and to control the amount of light transmittance, thereby performing image display.

Typically, liquid crystal displays also include a color filter to display color images by passing light through the color filter before passing the light through the liquid crystal layer. Color filters generally include red, green, and blue colors and usually require careful alignment with respect to each corresponding pixel when combining the two display panels. The potential for alignment errors may result in larger light-blocking members between pixels, reducing the aperture ratio of the display.

To compensate for this problem, a method in which the color filter is formed by an inkjet printing method has been proposed. When forming the color filter by the inkjet printing method, an exposure light is not used, simplifying the manufacturing process.

However, since liquid ink is used in the inkjet printing method, not all pixels may be easily and uniformly filled with ink to form the color filter, and ink from a color filter formed in one pixel may flow into a neighboring pixel, causing diminished color quality of the display.

SUMMARY OF THE INVENTION

Exemplary embodiments of the present invention provide a display panel in which a color filter may be sufficiently filled in a pixel without flowing over into an adjacent pixel.

Additional features of the invention will be set forth in the description which follows, and in part will be apparent from the description, or may be learned by practice of the invention.

Exemplary embodiments of the present invention disclose a display panel that comprises a substrate; a first partition arranged on the substrate, defining a first region, and comprising an undercut; a second partition arranged outside the first partition; a color filter formed on the substrate and positioned in the first region; and a common electrode arranged on the color filter.

Exemplary embodiments of the present invention also disclose a display panel that comprises a substrate; a gate line and a data line arranged on the substrate and intersecting each other; a thin film transistor (TFT) connected to the gate line and the data line; a passivation layer arranged on the TFT; a first partition arranged on the passivation layer, defining a pixel, and comprising an undercut; a second partition arranged outside the first partition; a color filter arranged on the passivation layer and in the pixel; and a pixel electrode arranged on the color filter and connected to the TFT.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
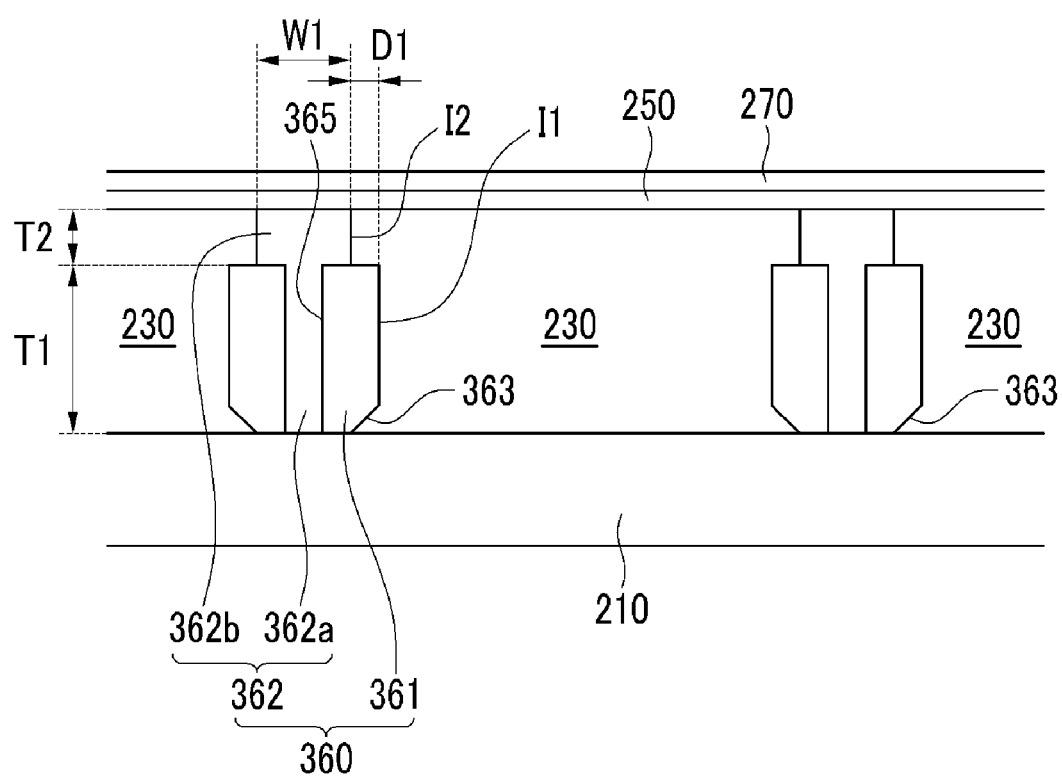
FIG. 1 is a cross-sectional view of a display panel according to exemplary embodiments of the present invention.

The invention is described more fully hereinafter with reference to the accompanying drawings, in which exemplary embodiments of the invention are shown. This invention, however, may be embodied in many different forms and should not be construed as limited to exemplary embodiments set forth herein. Rather, these exemplary embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, exemplary embodiments of the present invention are described in detail with reference to the accompanying drawings.

A display panel according to an exemplary embodiment of the present invention will be described with reference to FIG. 1.

FIG. 1 is a cross-sectional view of a display panel according to an exemplary embodiment of the present invention.

Referring to FIG. 1, a display panel includes a partition 360 arranged on a substrate 210. The partition 360 defines a region where a color filter 230 is arranged, and an overcoat 250 is arranged on the partition 360 and the color filter 230. A common electrode 270 is arranged on the overcoat 250. The partition 360 includes a first partition 361 made of a hydrophilic material and a second partition 362 made of a hydrophobic material.

The first partition 361 includes an undercut 363 and an opening 365 exposing the substrate 210, and the second partition 362 has a T-shape and includes a transverse portion 362a and a longitudinal portion 362b. The second partition 362 is arranged on the substrate 210 between two of the first partitions 361. The longitudinal portion 362b is positioned at the openings 365 of two first partitions 361, and the transverse portion 362a is positioned on two first partitions 361.

Figure 2:
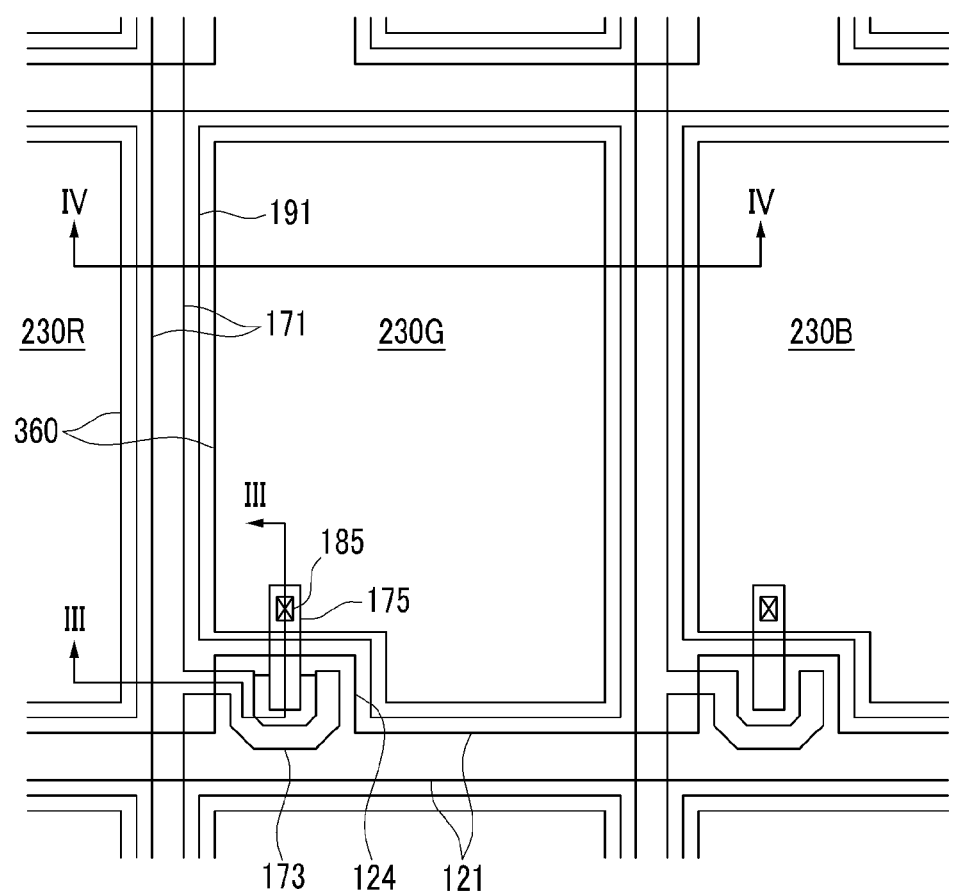
FIG. 2 is a layout view of a liquid crystal display including the display panel shown in FIG. 1.

Interfaces are formed between the color filter 230 and surfaces that bound the color filter 230, namely surfaces of the transverse portion 362a and the first partition 361 that contact the color filter 230. Also, with respect to the color filter 230, the interface I2 of the transverse portion 362a is positioned inside the interface I1 of the first partition 361. That is, the transverse portion 362a does not completely cover the top surface of the first partition 361. Here, "top" refers to the orientation of the partition 360 as shown in FIG. 1. Moreover, the partition 360 defines a pixel area (as shown in FIG. 2 as the space bordered by and enclosed by the partition 360 and as indicated by the space filled by the color filter 230 in FIG. 1).

Here, the ratio of the thickness T2 of the transverse portion 362a to the thickness T1 of the first partition 361 may be 1:3. The ratio of the distance D1 between the interface I2 of the transverse portion 362a and the interface I1 of the first partition 361 to the width W1 of the transverse portion 362a may be 1:5.

As described above, the first partition 361 is made of a hydrophilic material and has an undercut 363. As ink is provided by an inkjet printer and introduced into the pixel area to form the color filter 230, the second partition 362, by virtue of its hydrophobic composition, ensures that ink does not flow into a neighboring pixel area. The ink fills the pixel area and flows to meet the undercut 363, the first partition 361, and the transverse portion 362a, forming the interfaces described above.

Next, a liquid crystal display including the display panel shown in FIG. 1 will be described with reference to FIG. 2, FIG. 3, and FIG. 4.

FIG. 2 is a layout view of a liquid crystal display including the display panel shown in FIG. 1. FIG. 3 is a cross-sectional view taken along the line III-III of FIG. 2, and FIG. 4 is a cross-sectional view taken along the line IV-IV of FIG. 2.

Figure 3:
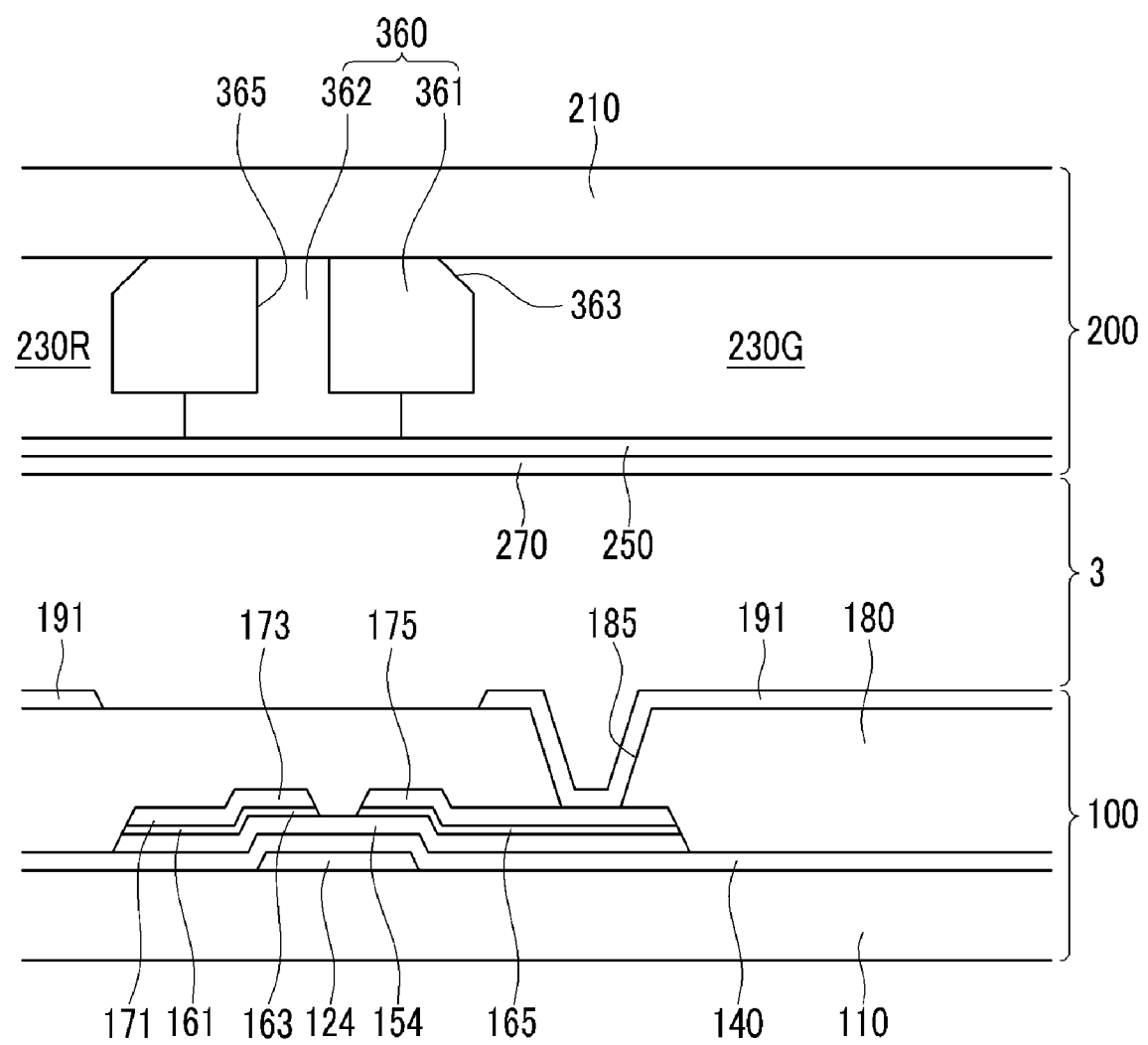
FIG. 3 is a cross-sectional view taken along the line III-III of FIG. 2.
Figure 4:
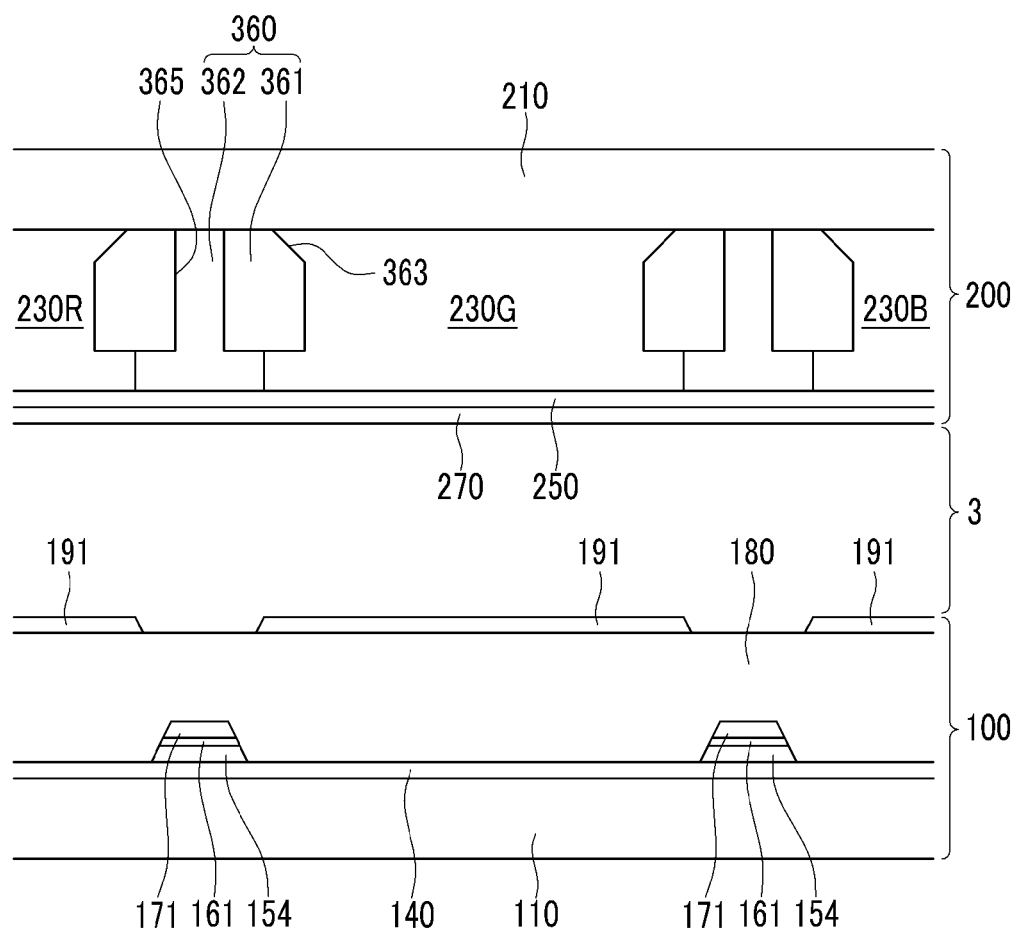
FIG. 4 is a cross-sectional view taken along the line IV-IV of FIG. 2.

Referring to FIG. 2, FIG. 3, and FIG. 4, a liquid crystal display includes a lower panel 100 and an upper panel 200 facing each other and a liquid crystal layer 3 interposed between the two display panels 100 and 200.

First, the lower panel 100 will be described.

A gate line 121 including a gate electrode 124 to transmit a gate signal is arranged on an insulation substrate 110. A gate insulating layer 140 is arranged on the gate line 121, and a semiconductor layer 154 is arranged on the gate insulating layer 140.

Ohmic contacts 161, 163, and 165 are arranged on the semiconductor layer 154, and a data line 171 and a drain electrode 175 are arranged on the ohmic contacts 161, 163, and 165 and on the gate insulating layer 140.

The data line 171 transmits a data signal and intersects the gate line 121. The data line 171 includes a source electrode 173 extending toward the gate electrode 124, and the source electrode 173 is opposite to the drain electrode 175 with respect to the gate electrode 124.

The gate electrode 124, the source electrode 173, and the drain electrode 175 form a thin film transistor (TFT) along with semiconductor layer 154, and the channel of the TFT is arranged in the semiconductor layer 154 between the source electrode 173 and the drain electrode 175.

The ohmic contacts 161, 163, and 165 are arranged between the underlying semiconductor layer 154 and the data line 171 and the drain electrode 175 arranged thereon, thereby reducing contact resistances.

A passivation layer 180 is arranged on the data line 171, the drain electrode 175, and the exposed semiconductor layer 154. A contact hole 185 is arranged in the passivation layer 180, and a pixel electrode 191 connected to the drain electrode 175 is arranged on the passivation layer 180.

Next, the upper panel 200 will be described.

A partition 360 is arranged on an insulation substrate 210. Color filters 230R, 230G, and 230B are arranged in the regions defined by the partition 360. An overcoat 250 is arranged on the partition 360 and the color filters 230R, 230G, and 230B, and a common electrode 270 is arranged on the overcoat 250.

The partition 360 is positioned at a portion of the upper panel 200 corresponding to the gate line 121, the data line 171, and the drain electrode 175 and includes the first partition 361 made of a hydrophilic material and the second partition 362 made of a hydrophobic material.

The first partition 361 includes an undercut 363 and an opening 365 exposing the substrate 210, and the second partition 362 has a T-shape that includes a transverse portion 362a and a longitudinal portion 362b. The longitudinal portion 362b is positioned at the opening 365, and the transverse portion 362a is positioned on the first partition 361. Also, the interface I2 of the transverse portion 362a is positioned inside the interface I1 of the first partition 361, and the color filters 230R, 230G, and 230B are arranged to the interface I2 of the second partition 362. Here, the partition 360 may function as a light-blocking member preventing light leakage from one color filter 230 to a neighboring color filter 230, which increases the color purity of the light transmitted through individual pixels.

Also, a liquid crystal layer 3 is disposed between the upper panel 200 and the lower panel 100.

Next, a liquid crystal display according to another exemplary embodiment of the present invention will be described with reference to FIG. 5 and FIG. 6.

Figure 5:
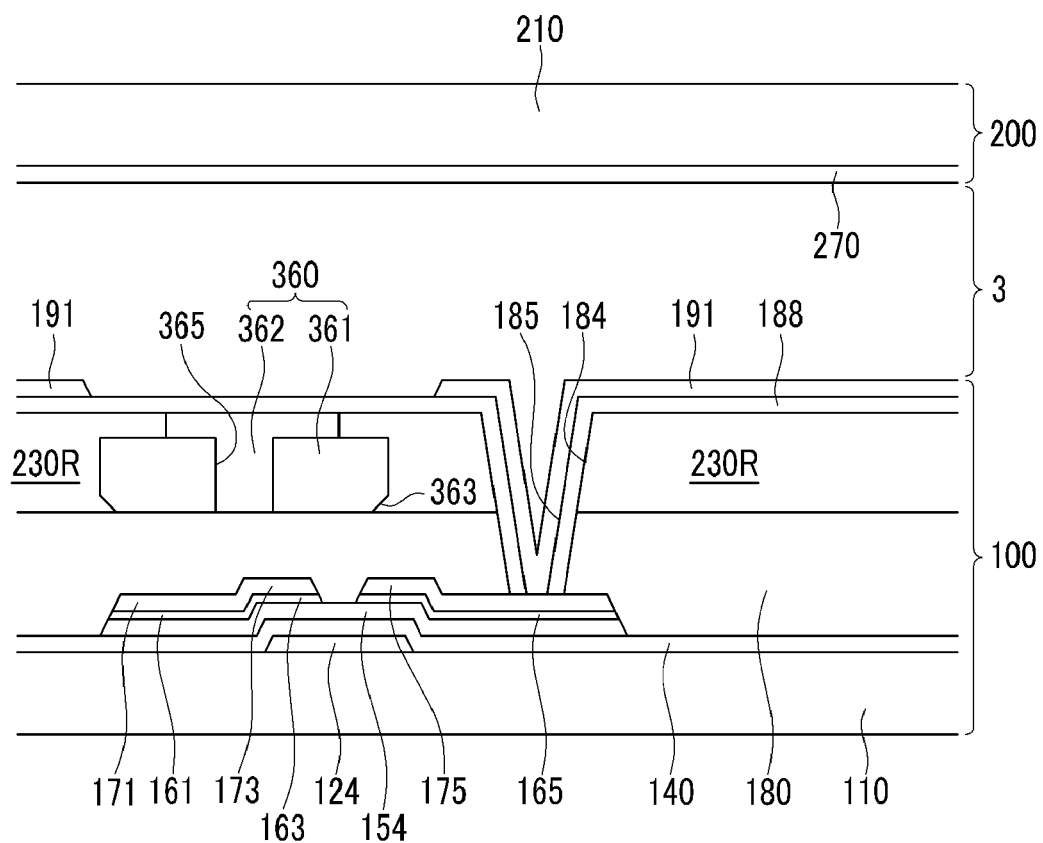
FIG. 5 and FIG. 6 are cross-sectional views of a liquid crystal display according to exemplary embodiments of the present invention.
Figure 6:
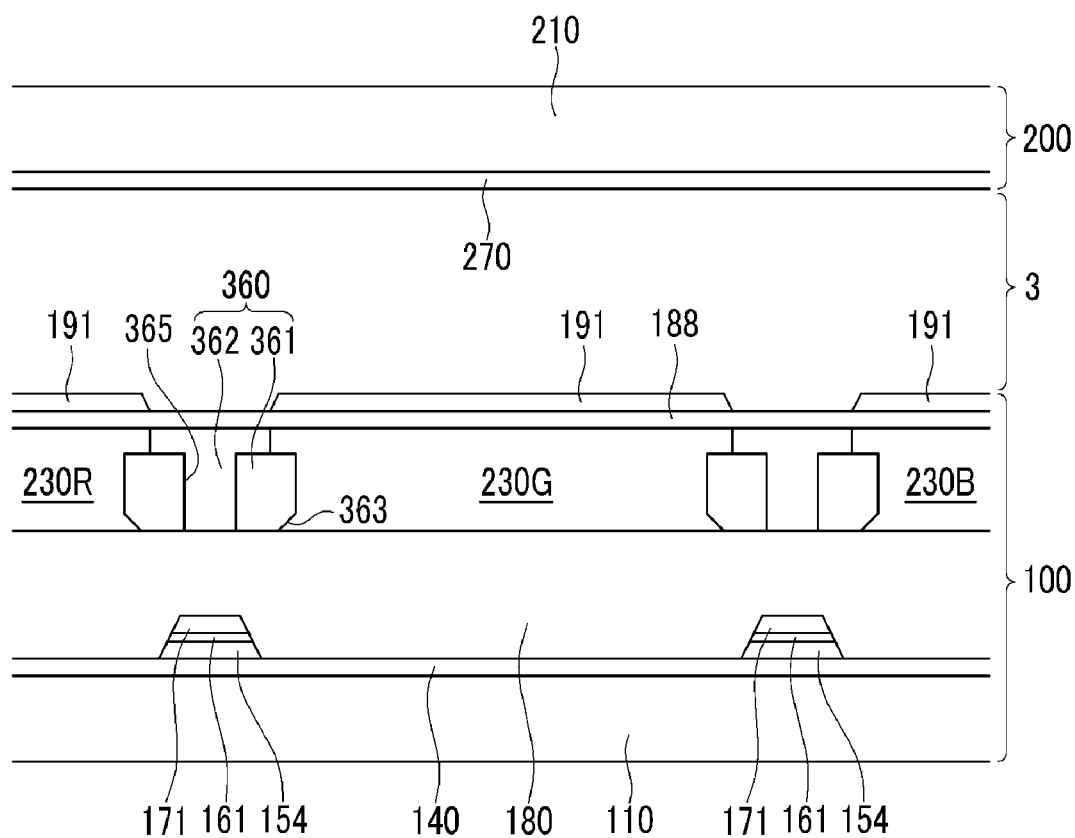

FIG. 5 and FIG. 6 are cross-sectional views of a liquid crystal display according to another exemplary embodiment of the present invention.

Referring to FIG. 5 and FIG. 6, a liquid crystal display according to another exemplary embodiment of the present invention is similar to the liquid crystal display shown in FIG. 2, but the partition 360 and color filters 230R, 230G, and 230B are arranged at the lower panel 100.

First, referring to the lower panel 100, the gate line 121 including the gate electrode 124 is arranged on the insulation substrate 110. A gate insulating layer 140 is arranged on the gate line 121, and a semiconductor layer 154 is arranged on the gate insulating layer 140.

Ohmic contacts 161, 163, and 165 are arranged on the semiconductor layer 154, and a data line 171 including a source electrode 173 and a drain electrode 175 are arranged on the ohmic contacts 161, 163, and 165 and the gate insulating layer 140.

A passivation layer 180 is arranged on the data line 171, the drain electrode 175, and the exposed semiconductor layer 154, and a partition 360 defining a pixel area is arranged on the passivation layer 180.

The partition 360 is positioned at a portion of the lower panel 100 corresponding to the gate line 121, the data line 171, and the drain electrode 175 and includes the first partition 361 made of a hydrophilic material and the second partition 362 made of a hydrophobic material.

The first partition 361 includes an undercut 363 and an opening 365 exposing the passivation layer 180, and the second partition 362 has a T-shape including a transverse portion 362a and a longitudinal portion 362b. The longitudinal portion 362b is positioned at the opening 365, and the transverse portion 362a is positioned on the first partition 361. The interface I2 of the transverse portion 362a is positioned inside the interface I1 of the first partition 361.

Here, the ratio of the thickness T2 of the transverse portion 362a to the thickness T1 of the first partition 361 may be 1:3, and the ratio of the distance D1 between the interface I2 of the transverse portion 362a and the interface I1 of the first partition 361 to the width W1 of the transverse portion 362a may be 1:5.

Here, the partition 360 may function as a light-blocking member preventing light leakage between neighboring color filters. The color filters 230R, 230G, and 230B are arranged in the pixel area on the passivation layer 180.

As described above, the first partition 361 is made of a hydrophilic material and has an undercut 363. As ink is provided by an inkjet printer and introduced into the pixel area to form the color filter 230, the second partition 362, by virtue of its hydrophobic composition, ensures that ink does not flow into a neighboring pixel area. The ink fills the pixel area and flows to meet the undercut 363, the first partition 361, and the transverse portion 362a, forming the interfaces.

The color filters 230R, 230G, and 230B and the passivation layer 180 have an opening 184 exposing the drain electrode 175. An overcoat 188 is arranged on the partition 360 and the color filters 230R, 230G, and 230B. The overcoat 188 has a contact hole 185 exposing the drain electrode 175 in the opening 184. A pixel electrode 191 is connected to the drain electrode 175 through the contact hole 185. A common electrode 270 is arranged on the whole surface of the insulation substrate 210 of the upper panel 200.

Next, a display panel according to another exemplary embodiment of the present invention will be described with reference to FIG. 7.

Figure 7:
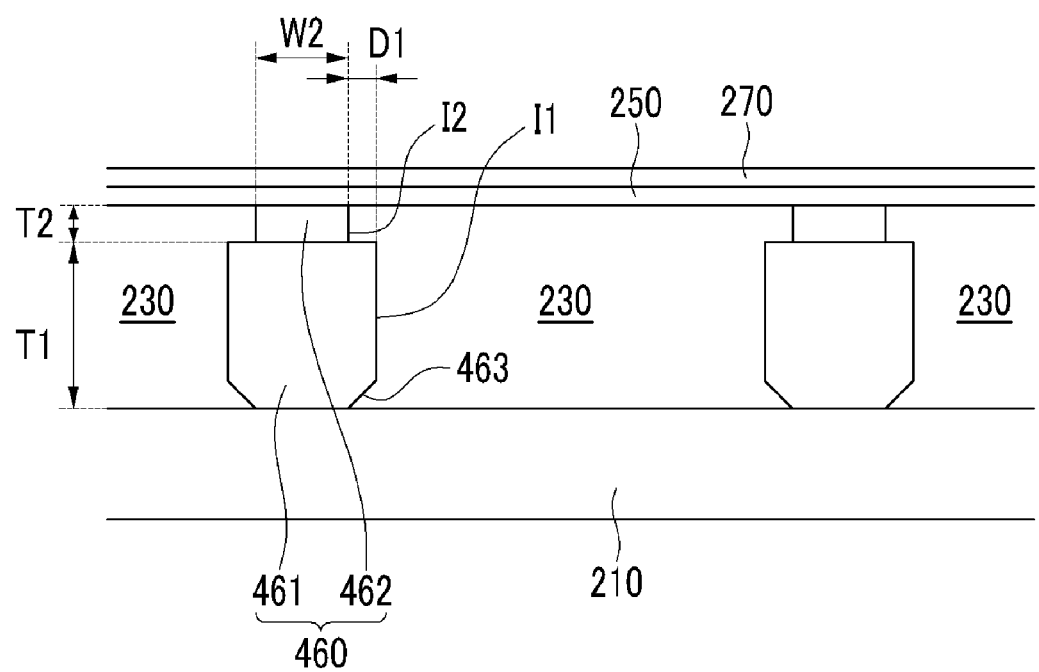
FIG. 7 is a cross-sectional view of a display panel according to an exemplary embodiment of the present invention.

FIG. 7 is a cross-sectional view of a display panel according to an exemplary embodiment of the present invention.

Referring to FIG. 7, the structure of a display panel is similar to that of the display panel shown in FIG. 1 except for the structure of the partition.

The partition 460 includes a first partition 461 made of a hydrophilic material and a second partition 462 made of a hydrophobic material. The first partition 461 has an undercut 463, and the second partition 462 is positioned on the first partition 461. Also, the interface I2 of the second partition 462 is disposed inside the interface I1 of the first partition 461 such that the color filter 230 is arranged to the interface I2 of the second partition 462.

Here, the ratio of the thickness T2 of the second partition 462 to the thickness T1 of the first partition 461 may be 1:3, and the ratio of the distance D1 between the interface I2 of the second partition 462 and the interface I1 of the first partition 461 to the width W2 of the second partition 462 may be 1:5.

Next, a liquid crystal display including the display panel shown in FIG. 7 will be described with reference to FIG. 8 and FIG. 9.

Figure 8:
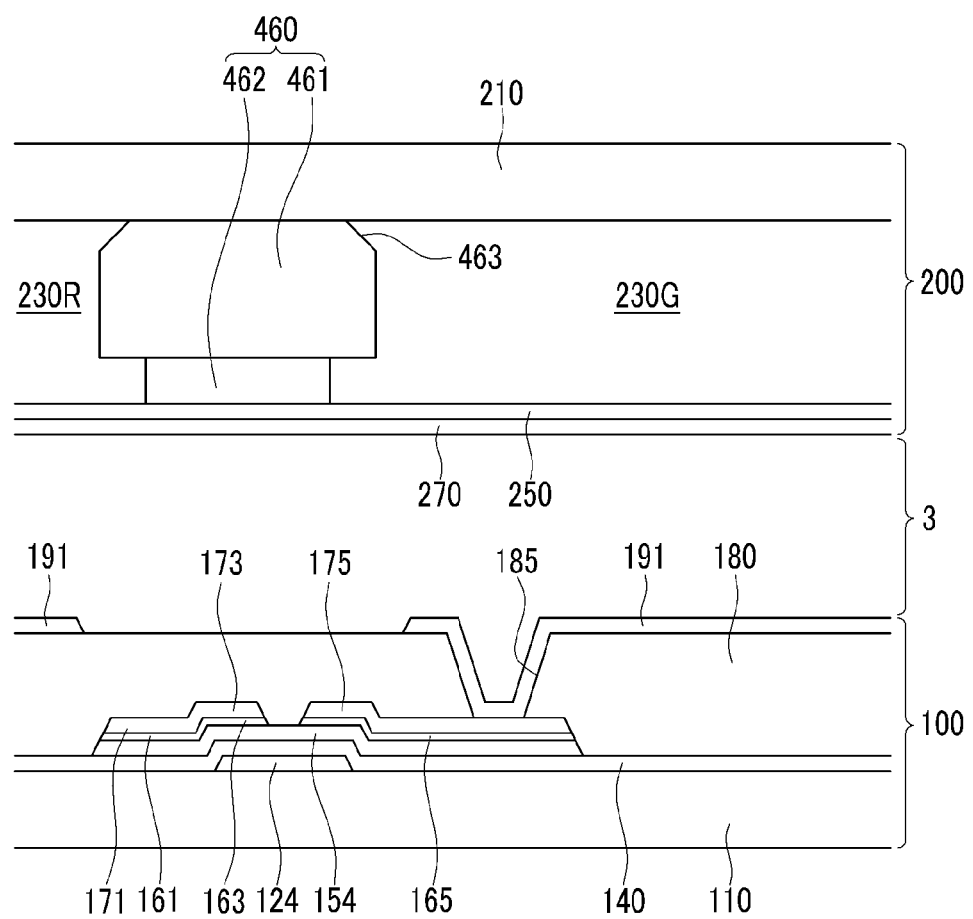
FIG. 8 and FIG. 9 are cross-sectional views of a liquid crystal display including the display panel shown in FIG. 7.
Figure 9:
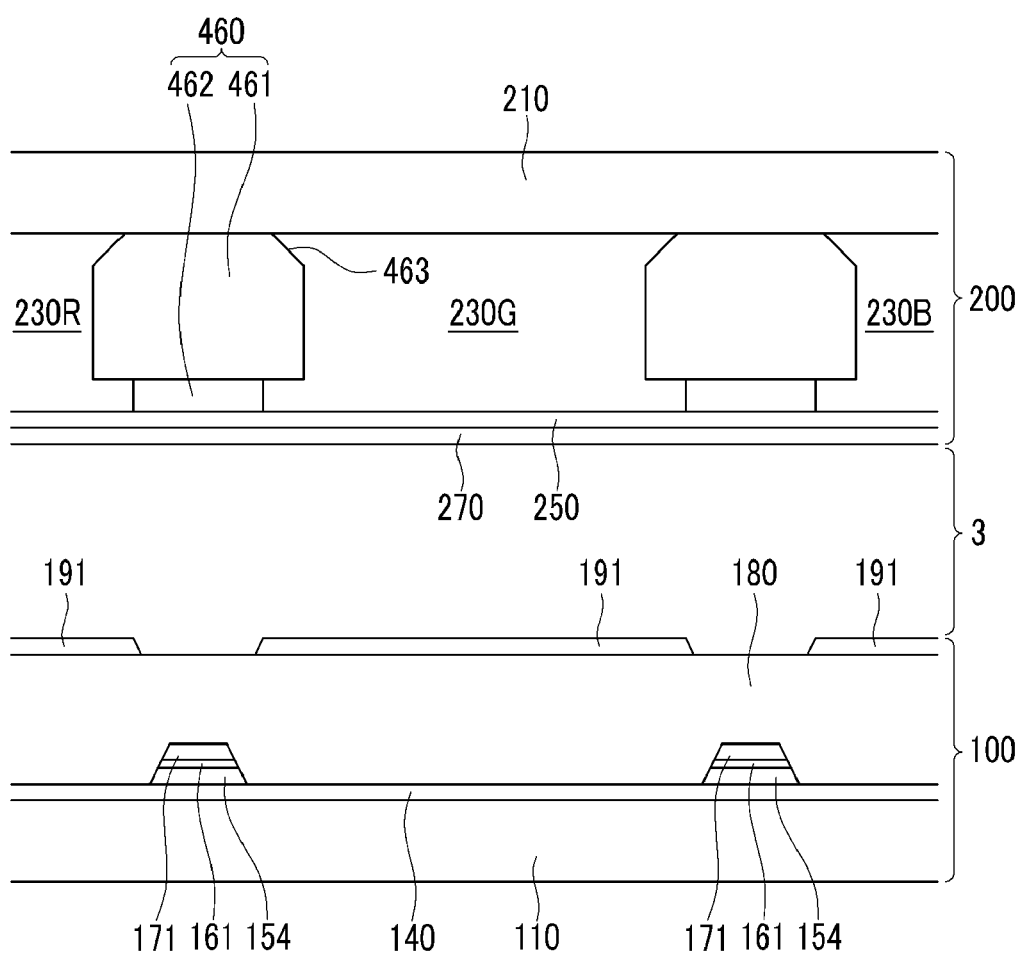

FIG. 8 and FIG. 9 are cross-sectional views of a liquid crystal display including the display panel shown in FIG. 7.

Referring to FIG. 8 and FIG. 9, the structure of a liquid crystal display including the display panel shown in FIG. 7 is similar to that of the liquid crystal display shown in FIG. 2, FIG. 3, and FIG. 4 except for the structure of the partition.

The partition 460 is positioned at a portion corresponding to the gate line 121, the data line 171, and the drain electrode 175, and includes the first partition 461 made of a hydrophilic material and the second partition 462 made of a hydrophobic material.

The first partition 461 has an undercut 463, and the second partition 462 is disposed on the first partition 461. Also, the interface I2 of the second partition 462 is positioned inside the interface I1 of the first partition 461 such that the color filters 230R, 230G, and 230B are arranged to the interface I2 of the second partition 462.

Here, the ratio of the thickness T2 of the second partition 462 to the thickness T1 of the first partition 461 may be 1:3, and the ratio of the distance D1 between the interface I2 of the second partition 462 and the interface I1 of the first partition 461 to the width W2 of the second partition 462 may be 1:5.

Here, the partition 460 may function as a light-blocking member preventing light leakage between neighboring color filters 230.

Next, a liquid crystal display according to another exemplary embodiment of the present invention will be described with reference to FIG. 10 and FIG. 11.

Figure 10:
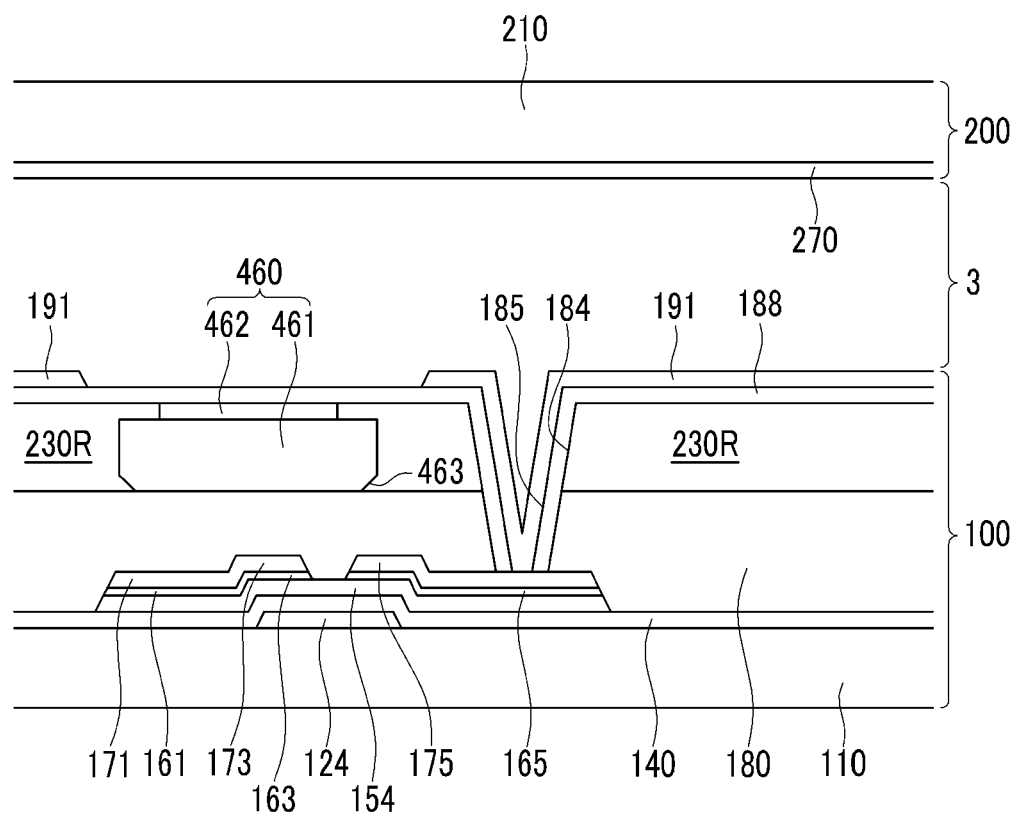
FIG. 10 and FIG. 11 are cross-sectional views of a liquid crystal display according to exemplary embodiments of the present invention.
Figure 11:
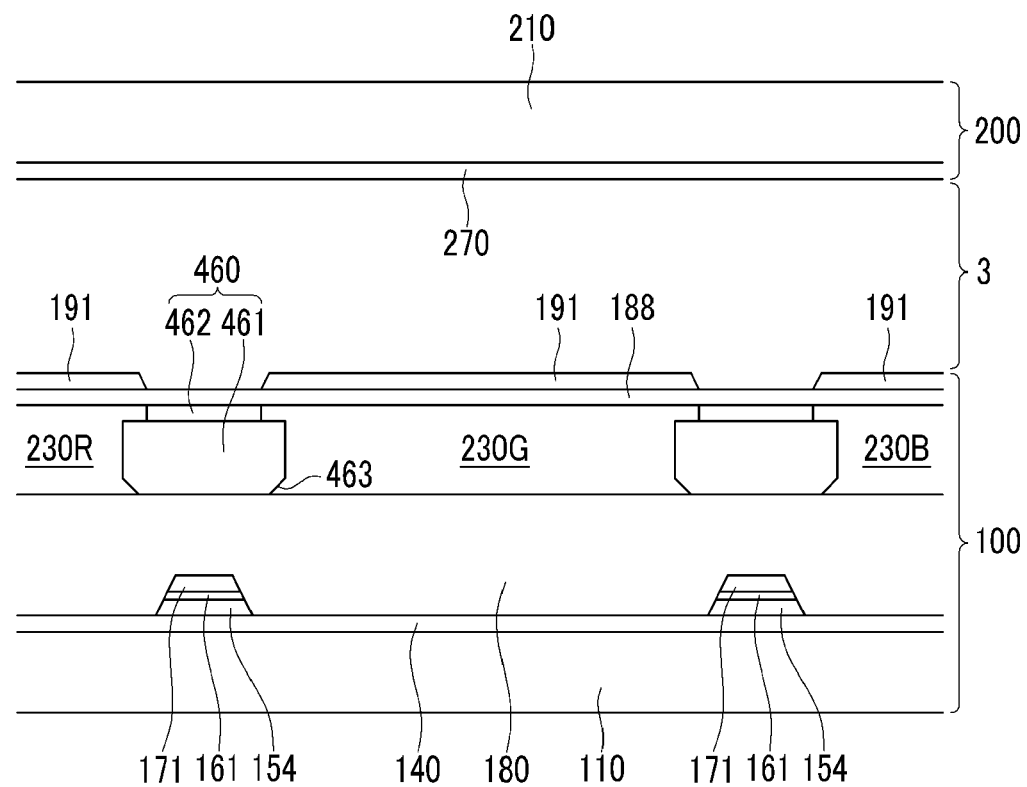

FIG. 10 and FIG. 11 are cross-sectional views of a liquid crystal display according to another exemplary embodiment of the present invention.

Referring to FIG. 10 and FIG. 11, the structure of the liquid crystal display is similar to that of the liquid crystal display of FIG. 5 and FIG. 6 except for the structure of the partition.

The partition 460 is positioned at a portion of the lower panel 100 corresponding to the gate line 121, the data line 171, and the drain electrode 175 and includes the first partition 461 made of a hydrophilic material and the second partition 462 made of a hydrophobic material.

The first partition 461 has an undercut 463, and the second partition 462 is disposed on the first partition 461. Also, the interface I2 of the second partition 462 is positioned inside the interface I1 of the first partition 461 with respect to the color filter 230 such that the color filters 230R, 230G, and 230B are arranged to the interface I2 of the second partition 462.

Here, the ratio of the thickness T2 of the second partition 462 to the thickness T1 of the first partition 461 may be 1:3, and the ratio of the distance D1 between the interface I2 of the second partition 462 and the interface I1 of the first partition 461 to the width W2 of the second partition 462 may be 1:5.

The partition 460 may function as a light blocking member preventing light leakage between neighboring color filters 230.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A display panel, comprising:
   a substrate;
   a first partition arranged on the substrate, defining a first region, and comprising an undercut;
   a second partition arranged outside the first partition;
   a color filter arranged on the substrate and positioned in the first region; and
   a common electrode arranged on the color filter,
   wherein the first partition further comprises a hydrophilic material, and the second partition comprises a hydrophobic material.

2. The display panel of claim 1, wherein
the first partition further comprises an opening exposing the substrate, and the second partition further comprises a transverse portion and a longitudinal portion,
wherein the longitudinal portion is positioned in the opening, and the transverse portion is positioned on the first partition.

3. The display panel of claim 2, further comprising:
a first interface arranged by the color filter and the first partition; and
a second interface arranged by the color filter and the transverse portion,
wherein the second interface is disposed inside the first interface, and the color filter is formed to the second interface.

4. The display panel of claim 3, wherein
the ratio of the thickness of the transverse portion to the thickness of the first partition is 1:3, and
the ratio of the distance between the second interface and the first interface to the width of the transverse portion is 1:5.

5. The display panel of claim 1, further comprising:
a first interface formed by the color filter and the first partition; and
a second interface formed by the color filter and the second partition,
wherein the second interface is disposed inside the first interface, and the color filter is formed to the second interface.

6. The display panel of claim 5, wherein
the ratio of the thickness of the transverse portion to the thickness of the first partition is 1:3, and
the ratio of the distance between the second interface and the first interface to the width of the transverse portion is 1:5.

7. A display panel comprising:
a substrate;
a gate line and a data line arranged on the substrate and intersecting each other;
a thin film transistor connected to the gate line and the data line;
a passivation layer arranged on the thin film transistor;
a first partition arranged on the passivation layer, defining a pixel, and comprising an undercut;
a second partition arranged outside the first partition;
a color filter arranged on the passivation layer and in the pixel; and
a pixel electrode arranged on the color filter and connected to the thin film transistor.

8. The display panel of claim 7, wherein
the first partition further comprises a hydrophilic material, and the second partition comprises a hydrophobic material.

9. The display panel of claim 8, wherein
the first partition further comprises an opening exposing the substrate, and the second partition comprises a transverse portion and a longitudinal portion,
wherein the longitudinal portion is positioned in the opening, and the transverse portion is positioned on the first partition.

10. The display panel of claim 9, further comprising:
a first interface formed by the color filter and the first partition; and
a second interface formed by the color filter and the transverse portion,
wherein the second interface is disposed inside the first interface, and the color filter is formed to the second interface.

11. The display panel of claim 10, wherein
the ratio of the thickness of the transverse portion to the thickness of the first partition is 1:3, and
the ratio of the distance between the second interface and the first interface to the width of the transverse portion is 1:5.

12. The display panel of claim 8, further comprising:
a first interface formed by the color filter and the first partition; and
a second interface formed by the color filter and the second partition,
wherein the second interface is disposed inside the first interface, and the color filter is formed to the second interface.

13. The display panel of claim 12, wherein
the ratio of the thickness of the transverse portion to the thickness of the first partition is 1:3, and
the ratio of the distance between the second interface and the first interface to the width of the transverse portion is 1:5.

14. The display panel of claim 7, wherein
the first partition further comprises an opening exposing the substrate, and the second partition comprises a transverse portion and a longitudinal portion,
wherein the longitudinal portion is positioned in the opening, and the transverse portion is positioned on the first partition.

15. The display panel of claim 14, further comprising:
a first interface formed by the color filter and the first partition; and
a second interface formed by the color filter and the transverse portion,
wherein the second interface is disposed inside the first interface, and the color filter is formed to the second interface.

16. The display panel of claim 15, wherein
the ratio of the thickness of the transverse portion to the thickness of the first partition is 1:3, and
the ratio of the distance between the second interface and the first interface to the width of the transverse portion is 1:5.

17. The display panel of claim 7, further comprising:
a first interface formed by the color filter and the first partition; and
a second interface formed by the color filter and the second partition,
wherein the second interface is disposed inside the first interface, and the color filter is formed to the second interface.

18. The display panel of claim 17, wherein
the ratio of the thickness of the transverse portion to the thickness of the first partition is 1:3, and
the ratio of the distance between the second interface and the first interface to the width of the transverse portion is 1:5.

* * * * *